US011050970B1

(12) United States Patent
Martin

(10) Patent No.: US 11,050,970 B1
(45) Date of Patent: Jun. 29, 2021

(54) DECEDENT COMMUNICATION ASSEMBLY

(71) Applicant: Paul Martin, Ocean Isle Beach, NC (US)

(72) Inventor: Paul Martin, Ocean Isle Beach, NC (US)

( * ) Notice: Subject to any disclaimer, the term of this patent is extended or adjusted under 35 U.S.C. 154(b) by 0 days.

(21) Appl. No.: 16/933,538

(22) Filed: Jul. 20, 2020

(51) Int. Cl.
| | |
|---|---|
| *H04N 5/775* | (2006.01) |
| *H04N 5/63* | (2006.01) |
| *H04R 1/02* | (2006.01) |
| *H04N 5/38* | (2006.01) |
| *H04R 1/40* | (2006.01) |
| *E04H 13/00* | (2006.01) |
| *A61G 17/00* | (2006.01) |
| *H02J 7/35* | (2006.01) |
| *H04N 5/60* | (2006.01) |
| *G11B 31/00* | (2006.01) |
| *H04R 3/12* | (2006.01) |

(52) U.S. Cl.
CPC ............. *H04N 5/775* (2013.01); *A61G 17/00* (2013.01); *E04H 13/003* (2013.01); *G11B 31/006* (2013.01); *H02J 7/35* (2013.01); *H04N 5/38* (2013.01); *H04N 5/602* (2013.01); *H04N 5/63* (2013.01); *H04R 1/025* (2013.01); *H04R 1/403* (2013.01); *H04R 3/12* (2013.01)

(58) Field of Classification Search
USPC .................................................. 386/200–230
See application file for complete search history.

(56) References Cited

U.S. PATENT DOCUMENTS

| | | | |
|---|---|---|---|
| 6,324,736 B1 | 12/2001 | Atrio | |
| 6,340,978 B1 | 1/2002 | Mindrum | |
| 9,226,059 B1 | 12/2015 | Knight | |
| 2001/0036354 A1 | 11/2001 | Majors | |
| 2003/0208890 A1 | 11/2003 | Kim | |
| 2004/0158960 A1* | 8/2004 | Shaw | A61G 17/0136 27/14 |
| 2007/0044287 A1* | 3/2007 | Parker | A61G 17/04 27/14 |
| 2010/0077580 A1* | 4/2010 | Holzman | A61G 17/04 27/10 |
| 2010/0292819 A1 | 11/2010 | Dannenberg | |
| 2013/0232744 A1* | 9/2013 | Drew | A61G 17/04 27/19 |
| 2015/0026938 A1* | 1/2015 | Rojdev | A47G 1/17 27/14 |
| 2020/0237598 A1* | 7/2020 | Chan | B27N 3/20 |
| 2020/0276070 A1* | 9/2020 | Reynolds | A61G 17/045 |

* cited by examiner

*Primary Examiner* — Hung Q Dang

(57) ABSTRACT

A decedent communication assembly for playing audio and video in a casket includes a casket for containing a deceased person. A display is mounted to a lid of the casket such that the display faces into the casket when the lid is closed. A plurality of speakers is each mounted to the casket to emit audible sound into the casket. A storage unit is coupled to the casket and the storage unit is in electrical communication with the display and each of the speakers. The storage unit stores video data and audio data. Moreover, the storage unit is in communication with an extrinsic electronic device for receiving the video data and the audio data from the extrinsic electronic device.

8 Claims, 7 Drawing Sheets ns
US 11,050,970 B1

DECEDENT COMMUNICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to communication devices and more particularly pertains to a new communication device for playing audio and video in a casket.

(2) Description of Related Art Including Information Disclosed Under 37 CFR 1.97 and 1.98

The prior art relates to communication devices including a casket that has a display screen and speakers mounting inside the casket for displaying video and audio at a funeral. The prior art discloses a multimedia device that can be placed at a gravesite for displaying audio and video of the deceased. The prior art discloses a headstone and casket assembly that includes speakers in the headstone casket, which are wired together, for playing music at a gravesite. The prior art discloses a headstone that has a multimedia device coupled thereto for playing video and audio at a gravesite. The prior art discloses a multimedia device that is placed within a casket and that is in wireless communication with a remote storage unit.

BRIEF SUMMARY OF THE INVENTION

An embodiment of the disclosure meets the needs presented above by generally comprising a casket for containing a deceased person. A display is mounted to a lid of the casket such that the display faces into the casket when the lid is closed. A plurality of speakers is each mounted to the casket to emit audible sound into the casket. A storage unit is coupled to the casket and the storage unit is in electrical communication with the display and each of the speakers. The storage unit stores video data and audio data. Moreover, the storage unit is in communication with an extrinsic electronic device for receiving the video data and the audio data from the extrinsic electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
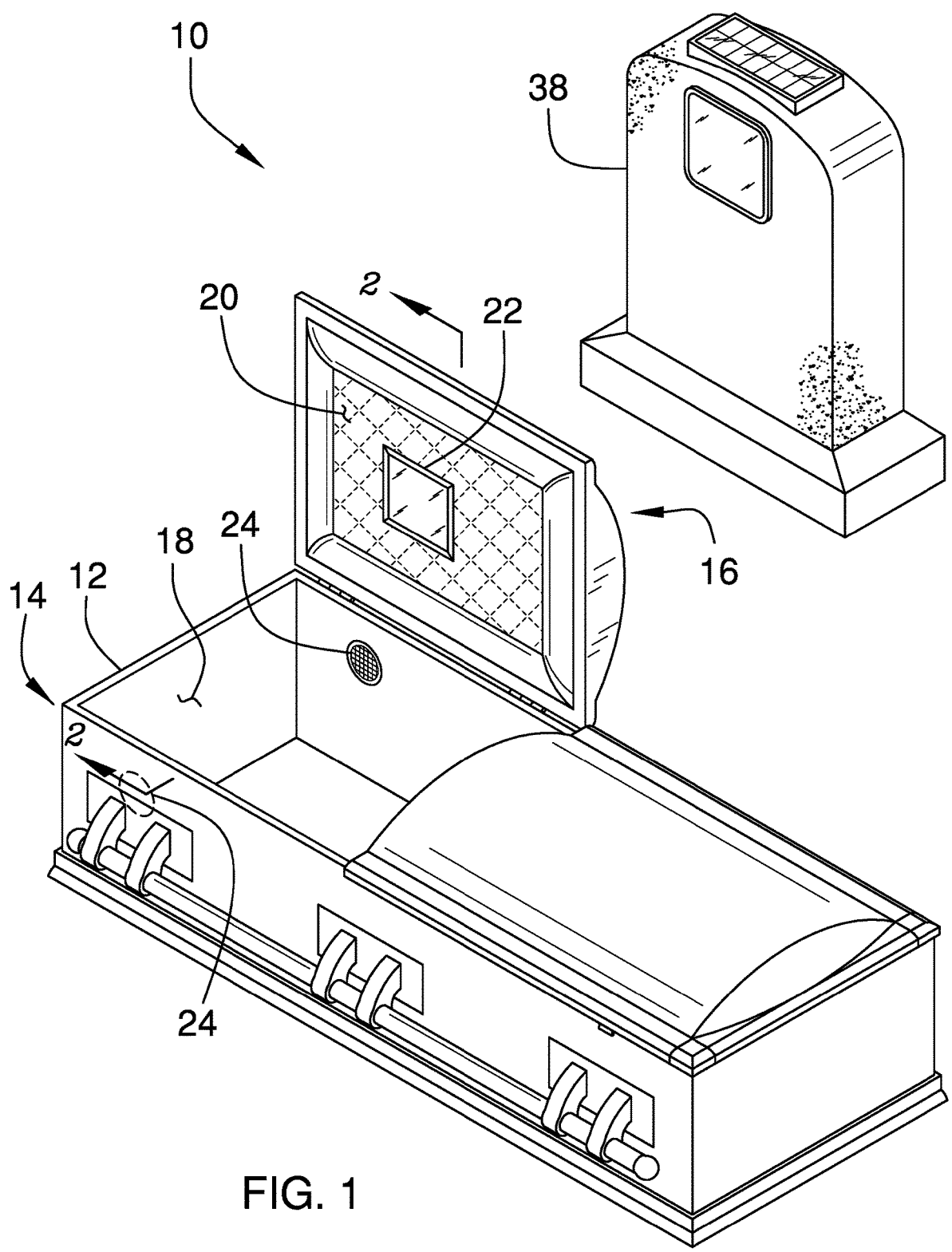
FIG. 1 is a perspective view of a decedent communication assembly according to an embodiment of the disclosure.
Figure 2:
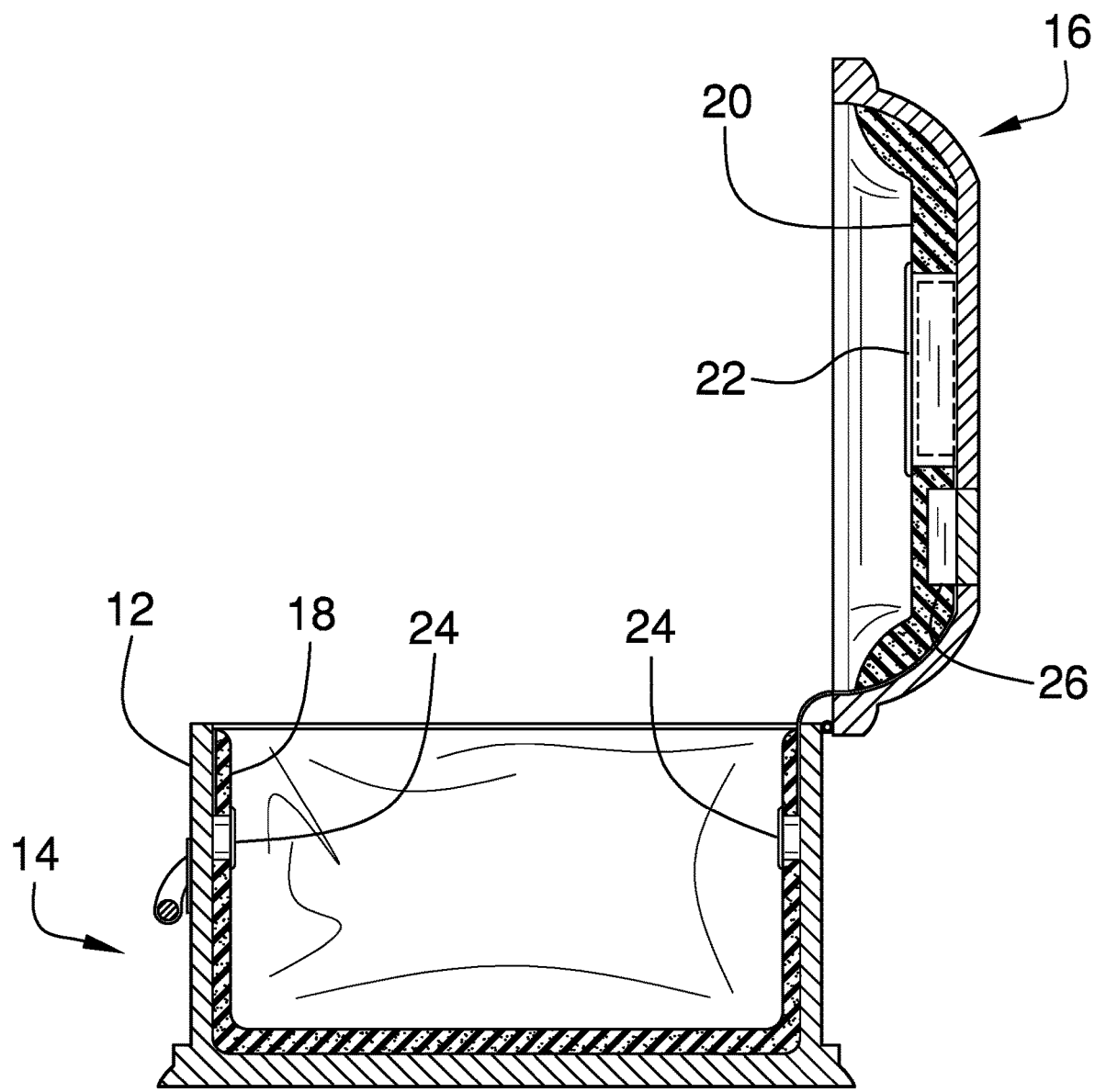
FIG. 2 is a cross sectional view taken along line 2-2 of FIG. 1 of an embodiment of the disclosure.
Figure 3:
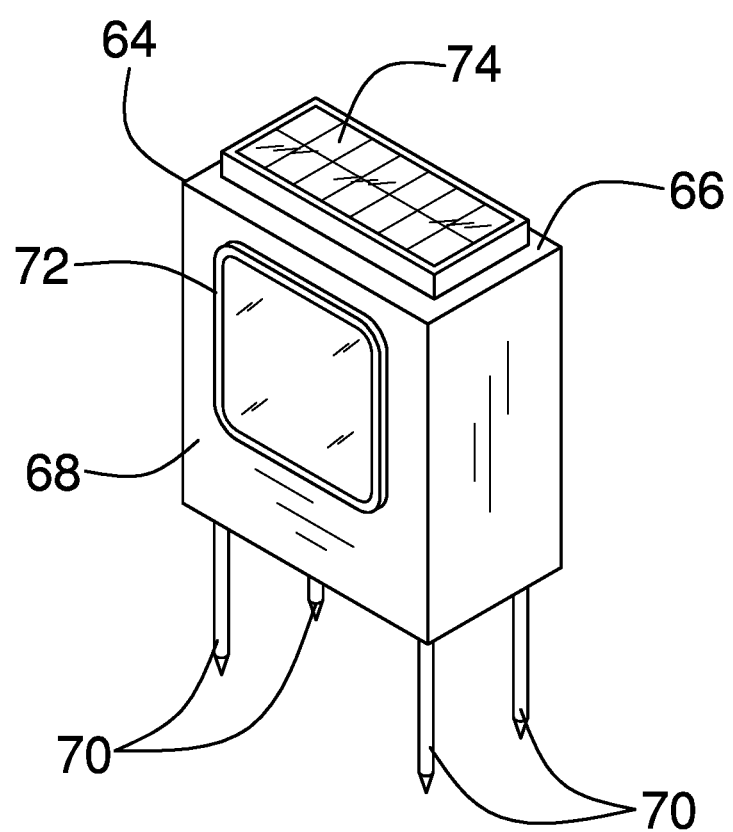
FIG. 3 is a front perspective view of a marker an embodiment of the disclosure.
Figure 4:
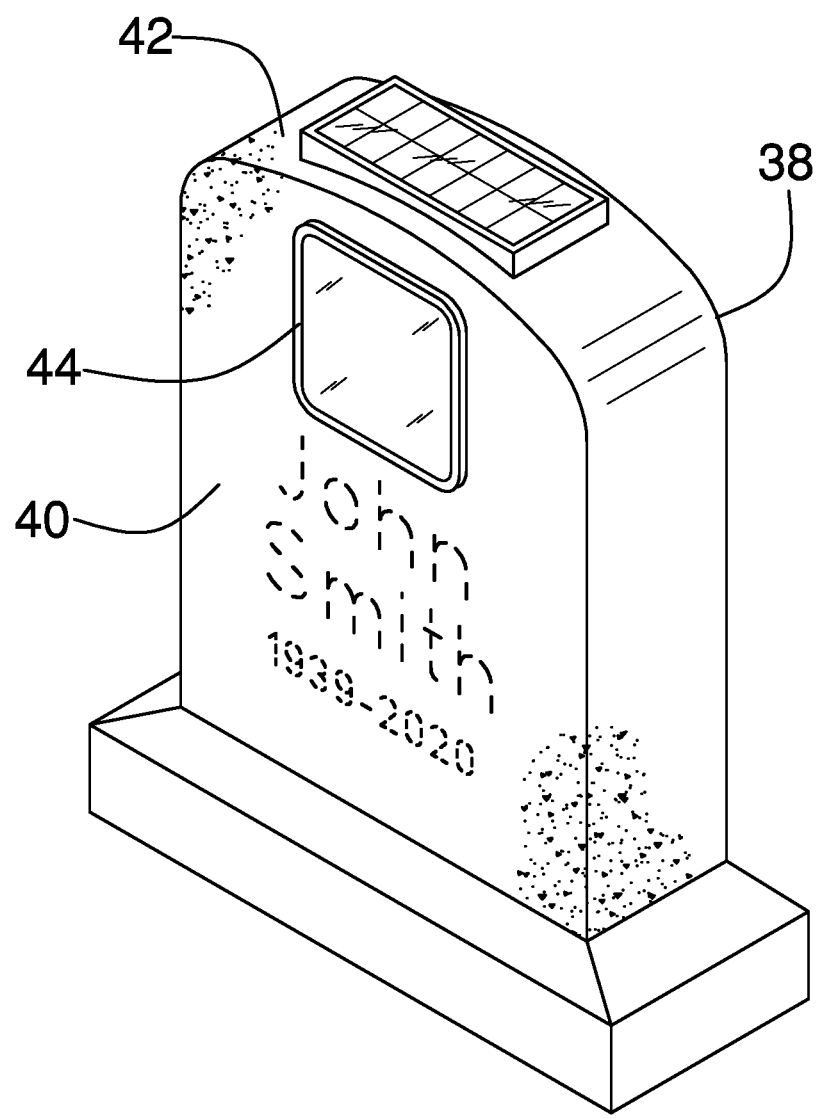
FIG. 4 is a front perspective view of headstone an embodiment of the disclosure.

With reference now to the drawings, and in particular to FIGS. 1 through 7 thereof, a new communication device embodying the principles and concepts of an embodiment of the disclosure and generally designated by the reference numeral 10 will be described.

As best illustrated in FIGS. 1 through 7, the decedent communication assembly 10 generally comprises a casket 12 for containing a deceased person. The casket 12 has a box portion 14 and a lid 16 that is hingedly coupled to the box portion 14. The box portion 14 has an inside surface 18 and the lid 16 has a bottom surface 20. The casket 12 may be a burial casket of any conventional design and structure. A display 22 is mounted to the lid 16 such that the display 22 faces into the box portion 14 of the casket 12 when the lid 16 is closed. The display 22 displays indicia which comprise imagery and the display 22 is positioned on the bottom surface 20 of the lid 16. The display 22 may comprise a touch screen display, an LED or other type of electronic display.

A plurality of speakers 24 is each mounted to the casket 12 to emit audible sound into the casket 12. Each of the speakers 24 is mounted to the inside surface 18 of the box portion 14 of the casket 12. A storage unit 26 is coupled to the casket 12 and the storage unit 26 is in electrical communication with the display 22 and each of the speakers 24. The storage unit 26 stores video data comprising digital video and digital imagery. In this way the display 22 can display 22 the digital video and digital imagery. Additionally, the storage unit 26 stores audio data comprising digital audio such that the plurality of speakers 24 can emit the digital audio. Additionally, the storage unit 26 is in communication with an extrinsic electronic device 28 for receiving the video data and the audio data from the extrinsic electronic device 28.

The storage unit 26 comprises a control circuit 30 that is coupled to the casket 12, and the control circuit 30 is electrically coupled to the display 22 and each of the speakers 24. The storage unit 26 includes an electronic memory 32 that is coupled to the casket 12. The electronic memory 32 is electrically coupled to the control circuit 30 and the electronic memory 32 stores the video data and the audio data. The electronic memory 32 may comprise miniaturized digital memory, such as RAM or ROM.

The storage unit 26 includes a transceiver 34 that is coupled to the casket 12 and the transceiver 34 is electrically coupled to the control circuit 30. The transceiver 34 is in wireless communication with the extrinsic electronic device 28 for downloading the video data and the audio data into the electronic memory 32. The transceiver 34 may comprise a radio frequency transceiver or the like and the transceiver 34 may employ Bluetooth communication protocols. Additionally, the extrinsic electronic device 28 may comprise a smart phone or other similar personal electronic device that has wireless communication capabilities. The storage unit 26 includes a power supply 36 that is coupled to the casket 12, the power supply 36 is electrically coupled to the control circuit 30 and the power supply 36 comprises at least one battery.

A headstone 38 is provided that that can be positioned at a gravesite for memorial purposes. The headstone 38 has a forward face 40 and an outer surface 42, and the headstone 38 may be manufactured from stone or any other resiliently material of which headstones are commonly comprised. A display 44 is coupled to the headstone 38 and the display 44 on the headstone 38 displays indicia comprising imagery. The display 44 on the headstone 38 is positioned on the forward face 40 of the headstone 38 to be visible to an observer viewing the gravesite. Additionally, the display 44 on the headstone 38 may comprise an LED or other type of electronic display.

A storage unit 46 is integrated into the headstone 38 and the storage unit 46 in the headstone 38 is in electrical communication with the display 44 on the headstone 38. The storage unit 46 in the headstone 38 stores data comprising digital video and digital imagery. In this way the display 44 on the headstone 38 can display the digital video and the digital imagery. The storage unit 46 in the headstone 38 comprises a control circuit 48 that is integrated into the headstone 38.

The storage unit 46 in the headstone 38 includes an electronic memory 50 that is integrated into the headstone 38. The electronic memory 50 in the headstone 38 is electrically coupled to the control circuit 48 in the headstone 38 and the electronic memory 50 in the headstone 38 stores the data. The storage unit 46 in the headstone 38 includes a transceiver 52 that is integrated into the headstone 38. The transceiver 52 in the headstone 38 is electrically coupled to the control circuit 48 in the headstone 38. Additionally, the transceiver 52 in the headstone 38 is in wireless communication with the extrinsic electronic device 28 for downloading the data into the electronic memory 50 in the headstone 38. The transceiver 52 in the headstone 38 may comprise a radio frequency transceiver or the like and the transceiver 52 in the headstone 38 may employ Bluetooth communication protocols.

The storage unit 46 in the headstone 38 includes a power supply 54 that is coupled to the headstone 38. The power supply 54 on the headstone 38 is electrically coupled to the control circuit 48 in the headstone 38. The power supply 54 on the headstone 38 comprises at least one battery 56 that is integrated into the headstone 38. The at least one battery 56 in the headstone 38 is electrically coupled to the control circuit 48 in the headstone 38. The power supply 54 on the headstone 38 also includes a solar panel 58 that is coupled to the outer surface 42 of the headstone 38 such that the solar panel 58 is exposed to sunlight. The solar panel 58 is electrically coupled to the at least one battery 56 in the headstone 38 for charging the at least one battery 56 in the headstone 38.

Figure 5:
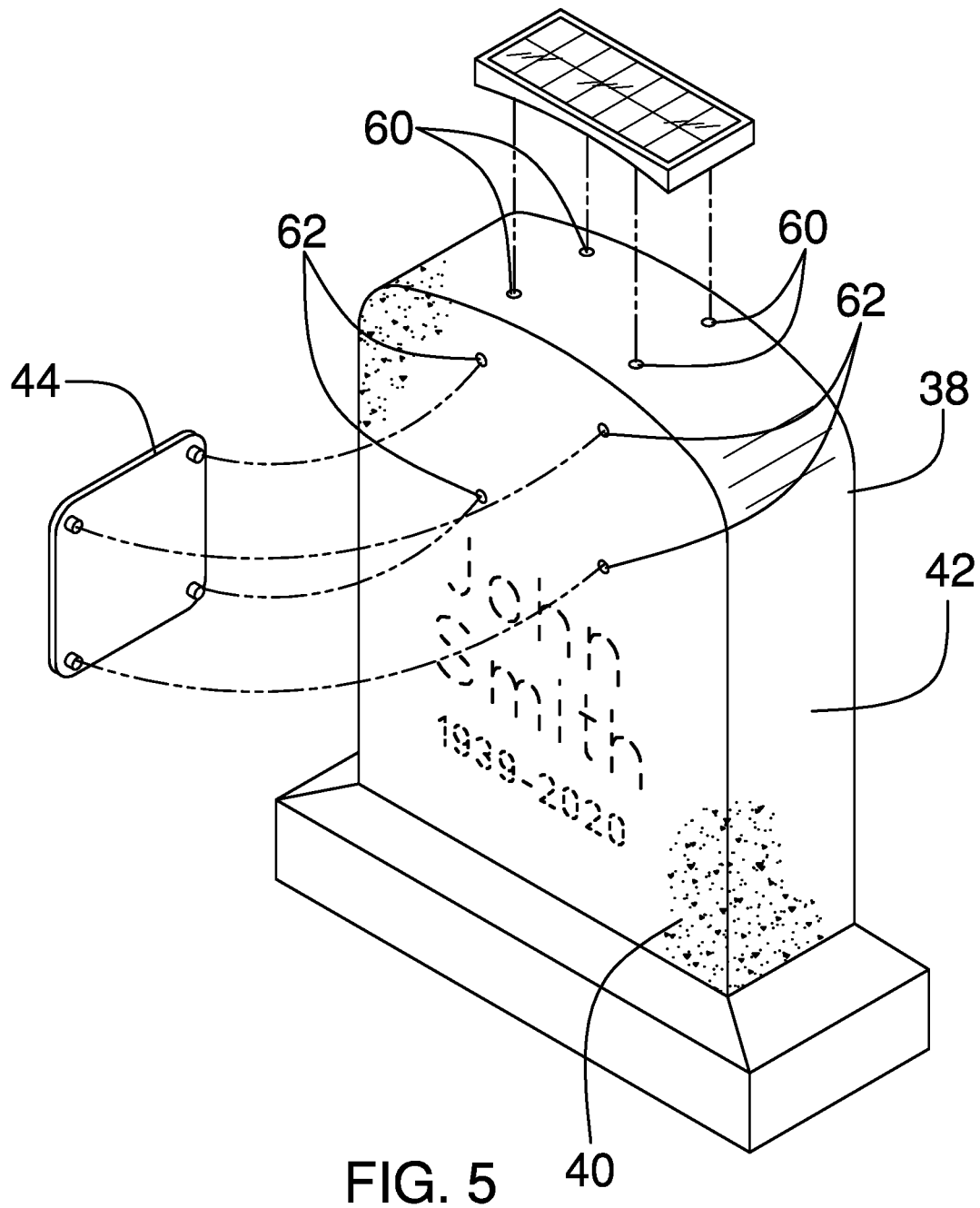
FIG. 5 is an exploded perspective view of a headstone of an embodiment of the disclosure.
Figure 6:
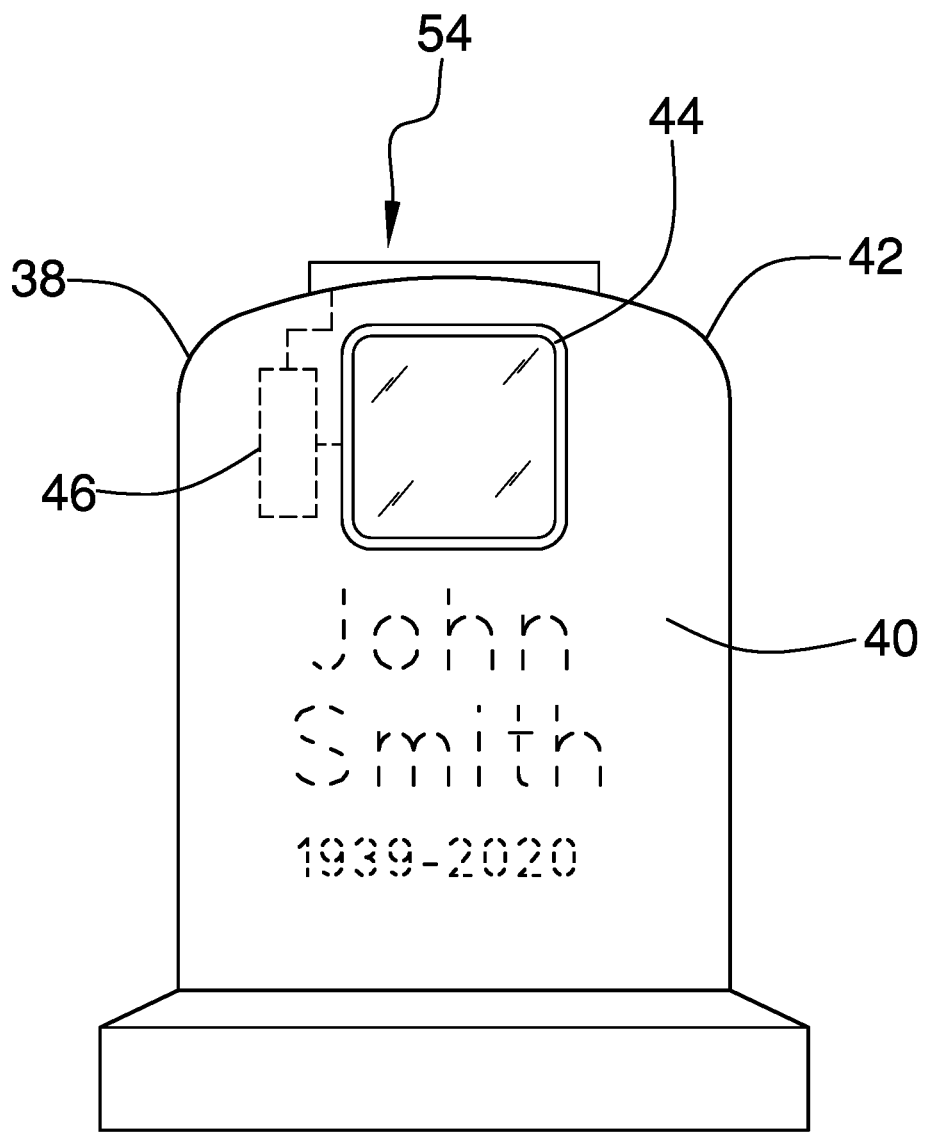
FIG. 6 is a front phantom view of a headstone of an embodiment of the disclosure.
Figure 7:
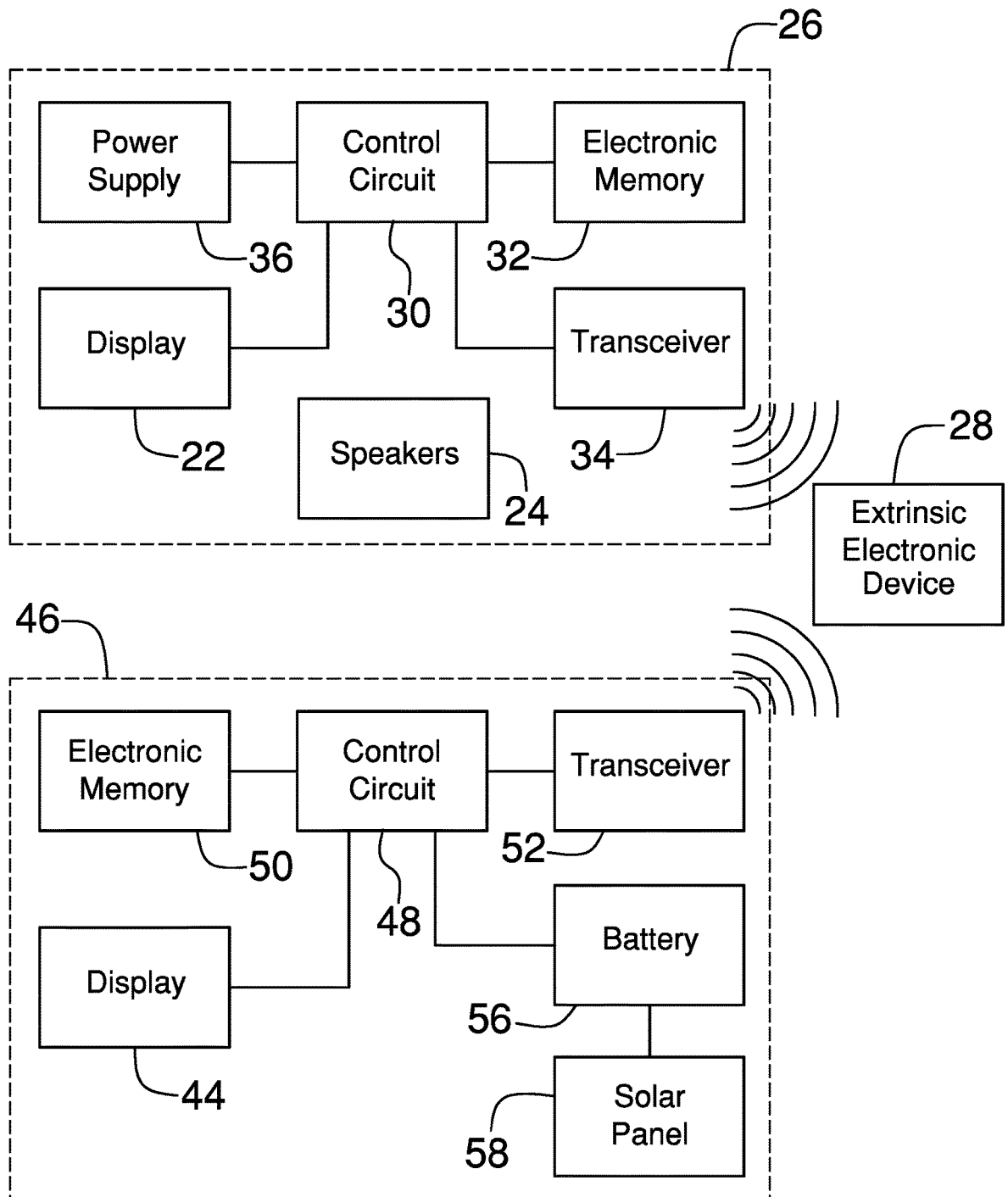
FIG. 7 is a schematic view of an embodiment of the disclosure.

As is most clearly shown in FIG. 5, a plurality of first wells 60 may each be recessed into the outer surface 42 of the headstone 38 and a plurality of second wells 62 may each be recessed into the forward face 40 of the headstone 38. The solar panel 58 may engage each of the first wells 60 and the display 44 on the headstone 38 may engage each of the second wells 62 for removably attaching the solar panel 58 and the display 44 to the headstone 38. As is most clearly shown in FIG. 3, a marker 64 may be provided that has top side 66, a front side 68 and a plurality of spikes 70 extending downwardly therefrom. The spikes 70 are insertable into the ground at a gravesite for displaying the marker 64. Additionally, a display 72 and solar panel 74 may each be coupled to a respective front side 66 and top side 66 of the marker 64. The display 72 may display video and photos and the solar panel 74 may charge the display.

In use, the extrinsic electronic device 28 is synchronized with the transceiver 34 in the casket 12 to download the video data and the audio data into the electronic memory 32 in the casket 12. In this way the display 22 in the casket 12 displays the video and images. Additionally, the speakers 24 emit the audible sounds. The extrinsic electronic device 28 can also be synchronized with the transceiver 52 in the headstone 38 to download the video data and the audio data into the electronic memory 50 in the headstone 38. In this way the display 44 on the headstone 38 displays the video imagery stored in the electronic memory 50 in the headstone 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A decedent communication assembly for transmitting messages to a deceased person in a casket, said assembly comprising:
 a casket for containing a deceased person, said casket having a box portion and a lid being hingedly coupled to said box portion, said box portion having an inside surface, said lid having a bottom surface;
 a display being mounted to said lid such that said display is faces into said box portion of said casket when said lid is closed, said display displaying indicia comprising imagery, said display being positioned on said bottom surface of said lid;
 a plurality of speakers, each of speakers being mounted to said casket wherein each of said speakers is configured to emit audible sound into said casket, each of said speakers being mounted to said inside surface of said box portion of said casket;
 a storage unit being coupled to said casket, said storage unit being in electrical communication with said display and each of said speakers, said storage unit storing video data comprising digital video and digital imagery wherein said display is configured to display the digital video and digital imagery, said storage unit storing audio data comprising digital audio wherein said plurality of speakers is configured to emit the digital audio, said storage unit being in communication with an extrinsic electronic device for receiving the video data and the audio data from the extrinsic electronic device;
 a headstone being configured to be positioned at a gravesite, said headstone having a forward face and an outer surface;
 a display being coupled to said headstone, said display on said headstone is configured to display indicia comprising imagery, said display on said headstone being positioned on said forward face of said headstone wherein said display on said headstone is configured to be visible to an observer viewing the gravesite; and
 a storage unit being integrated into said headstone, said storage unit in said headstone being in electrical communication with said display on said headstone, said storage unit in said headstone storing data comprising digital video and digital imagery wherein said display on said headstone is configured to display the digital video and the digital imagery.

2. The assembly according to claim 1, wherein said storage unit in said casket comprises:
 a control circuit being coupled to said casket, said control circuit being electrically coupled to said display in said casket and each of said speakers; and
 an electronic memory being coupled to said casket, said electronic memory being electrically coupled to said control circuit, said electronic memory storing said video data and said audio data.

3. The assembly according to claim 2, wherein said storage unit in said casket comprises a transceiver being coupled to said casket, said transceiver being electrically coupled to said control circuit, said transceiver being in wireless communication with the extrinsic electronic device for downloading said video data and said audio data into said electronic memory.

4. The assembly according to claim 2, wherein said storage unit in said casket comprises a power supply being coupled to said casket, said power supply being electrically coupled to said control circuit, said power supply comprising at least one battery.

5. The assembly according to claim 1, wherein said storage unit in said headstone comprises:
 a control circuit being integrated into said headstone; and
 an electronic memory being integrated into said headstone, said electronic memory in said headstone being electrically coupled to said control circuit in said headstone, said electronic memory in said headstone storing said data.

6. The assembly according to claim 5, wherein said storage unit in said headstone comprises a transceiver being integrated into said headstone, said transceiver in said headstone being electrically coupled to said control circuit in said headstone, said transceiver in said headstone being in wireless communication with the extrinsic electronic device for downloading said data into said electronic memory in said headstone.

7. The assembly according to claim 5, wherein said storage unit in said headstone comprises a power supply being coupled to said headstone, said power supply on said headstone being electrically coupled to said control circuit in said headstone, said power supply on said headstone comprising:
 at least one battery being integrated into said headstone, said at least one battery in said headstone being electrically coupled to said control circuit in said headstone; and
 a solar panel being coupled to said outer surface of said headstone wherein said solar panel is configured to be exposed to sunlight, said solar panel being electrically coupled to said at least one battery in said headstone for charging said at least one battery in said headstone.

8. A decedent communication assembly for transmitting messages to a deceased person in a casket, said assembly comprising:
 a casket for containing a deceased person, said casket having a box portion and a lid being hingedly coupled to said box portion, said box portion having an inside surface, said lid having a bottom surface;
 a display being mounted to said lid such that said display is faces into said box portion of said casket when said lid is closed, said display displaying indicia comprising imagery, said display being positioned on said bottom surface of said lid;
 a plurality of speakers, each of speakers being mounted to said casket wherein each of said speakers is configured to emit audible sound into said casket, each of said speakers being mounted to said inside surface of said box portion of said casket; and
 a storage unit being coupled to said casket, said storage unit being in electrical communication with said display and each of said speakers, said storage unit storing video data comprising digital video and digital imagery wherein said display is configured to display the digital video and digital imagery, said storage unit storing audio data comprising digital audio wherein said plurality of speakers is configured to emit the digital audio, said storage unit being in communication with an extrinsic electronic device for receiving the video data and the audio data from the extrinsic electronic device, said storage unit comprising:
 a control circuit being coupled to said casket, said control circuit being electrically coupled to said display and each of said speakers;

an electronic memory being coupled to said casket, said electronic memory being electrically coupled to said control circuit, said electronic memory storing said video data and said audio data;

a transceiver being coupled to said casket, said transceiver being electrically coupled to said control circuit, said transceiver being in wireless communication with the extrinsic electronic device for downloading said video data and said audio data into said electronic memory; and a power supply being coupled to said casket, said power supply being electrically coupled to said control circuit, said power supply comprising at least one battery;

a headstone being configured to be positioned at a gravesite, said headstone having a forward face and an outer surface;

a display being coupled to said headstone, said display on said headstone is configured to display indicia comprising imagery, said display on said headstone being positioned on said forward face of said headstone wherein said display on said headstone is configured to be visible to an observer viewing the gravesite; and a storage unit being integrated into said headstone, said storage unit in said headstone being in electrical communication with said display on said headstone, said storage unit in said headstone storing data comprising digital video and digital imagery wherein said display on said headstone is configured to display the digital video and the digital imagery, said storage unit in said headstone comprising:

a control circuit being integrated into said headstone;

an electronic memory being integrated into said headstone, said electronic memory in said headstone being electrically coupled to said control circuit in said headstone, said electronic memory in said headstone storing said data;

a transceiver being integrated into said headstone, said transceiver in said headstone being electrically coupled to said control circuit in said headstone, said transceiver in said headstone being in wireless communication with the extrinsic electronic device for downloading said data into said electronic memory in said headstone; and a power supply being coupled to said headstone, said power supply on said headstone being electrically coupled to said control circuit in said headstone, said power supply on said headstone comprising:

at least one battery being integrated into said headstone, said at least one battery in said headstone being electrically coupled to said control circuit in said headstone; and a solar panel being coupled to said outer surface of said headstone wherein said solar panel is configured to be exposed to sunlight, said solar panel being electrically coupled to said at least one battery in said headstone for charging said at least one battery in said headstone.

* * * * *